(12) United States Patent
Lewis

(10) Patent No.: US 10,865,941 B2
(45) Date of Patent: Dec. 15, 2020

(54) SAFETY SYSTEM AND METHOD FOR POWER TOOLS

(71) Applicant: Dennis E. Lewis, Ware, MA (US)

(72) Inventor: Dennis E. Lewis, Ware, MA (US)

( * ) Notice: Subject to any disclaimer, the term of this patent is extended or adjusted under 35 U.S.C. 154(b) by 136 days.

(21) Appl. No.: 16/196,317

(22) Filed: Nov. 20, 2018

(65) Prior Publication Data
US 2020/0158284 A1   May 21, 2020

(51) Int. Cl.
F16P 3/12 (2006.01)
H02K 7/14 (2006.01)
H02K 11/28 (2016.01)
H02K 11/26 (2016.01)
B27G 21/00 (2006.01)
B27B 5/38 (2006.01)
B27G 19/02 (2006.01)
B27G 19/06 (2006.01)
B27B 13/14 (2006.01)

(52) U.S. Cl.
CPC ............. F16P 3/12 (2013.01); H02K 7/14 (2013.01); H02K 11/26 (2016.01); H02K 11/28 (2016.01); B27B 5/38 (2013.01); B27B 13/14 (2013.01); B27G 19/02 (2013.01); B27G 19/06 (2013.01); B27G 21/00 (2013.01)

(58) Field of Classification Search
CPC .......... H02K 11/28; H02K 11/26; H02K 7/14; F16P 3/12; B27B 13/14; B27B 5/38; B27G 21/00; B27G 19/06; B27G 19/02
USPC ........................................................... 173/1
See application file for complete search history.

(56) References Cited

U.S. PATENT DOCUMENTS

| 4,152,833 | A | * | 5/1979 | Phillips | B27B 17/083 30/382 |
| 5,294,874 | A | * | 3/1994 | Hessenberger | H02P 3/06 318/245 |
| 5,741,048 | A | * | 4/1998 | Eccleston | B60T 7/20 303/20 |
| 6,236,177 | B1 | * | 5/2001 | Zick | B23D 59/001 318/362 |
| 7,225,712 | B2 | | 6/2007 | Gass et al. | |
| 7,600,455 | B2 | | 10/2009 | Gass et al. | |
| 7,610,836 | B2 | | 11/2009 | Gass et al. | |
| 7,895,927 | B2 | | 3/2011 | Gass | |
| 8,011,279 | B2 | | 9/2011 | Gass et al. | |
| 8,191,450 | B2 | | 6/2012 | Gass | |
| 2002/0017176 | A1 | * | 2/2002 | Gass | B23D 59/001 83/13 |
| 2002/0020271 | A1 | * | 2/2002 | Gass | B27G 19/02 83/477.2 |
| 2005/0155473 | A1 | * | 7/2005 | Gass | B23D 59/001 83/58 |

(Continued)

Primary Examiner — Nathaniel C Chukwurah
(74) Attorney, Agent, or Firm — Grogan, Tuccillo & Vanderleeden, LLP

(57) ABSTRACT

A safety system for a power tool having a motor and a cutting tool driven by the motor includes a control device configured to detect a direct contact of a conductive material with the cutting tool, the direct contact of the conductive material with the cutting tool defining a contact event, and a braking device movable between a retracted position and an engaged position. The control device is configured to interrupt electrical power to the motor and control the braking device to the engaged position when the contact event is detected.

17 Claims, 2 Drawing Sheets

(56) References Cited

U.S. PATENT DOCUMENTS

2009/0241748 A1* 10/2009 Keller .................... B27G 19/02
                                                            83/522.13
2011/0048197 A1*  3/2011 Winkler ................ B23Q 17/00
                                                               83/58

* cited by examiner

SAFETY SYSTEM AND METHOD FOR POWER TOOLS

FIELD OF THE INVENTION

The present invention relates generally to electric devices and, more particularly, to a system and method for improving the safety of power equipment such as saws having rotating blades.

BACKGROUND OF THE INVENTION

Power equipment such as table saws, circular saws, radial arm saws, miter saws and other machinery for cutting, drilling, sawing, or otherwise modifying workpieces made from various materials include cutting implements such as circular saw blades and knife blades that present a risk of injury to a user of such equipment. In particular, these implements, often rotating at high speed, can inflict significant damage to the human body if it inadvertently comes in contact with such implements. In view of this risk, various safety systems and features have been heretofore incorporated into power equipment to minimize the risk of injury. For example, table saws, miter saws and circular saws are often outfitted with various blade guards, fences and emergency stop buttons and switches to minimize the risk of a user coming in contact with a cutting implement or to allow rapid shut off in the event contact does happen. While these features have certainly reduced the number of blade contacts, there are many situations where the nature of the equipment and the operations to be performed using such equipment preclude using a guard that obstructs access to rotating cutting implements.

Other known safety systems try to prevent or minimize injury by detecting the presence of an extremity of a user near a saw blade or other cutting implement and interrupting operation of the machine. Yet other systems aim to interrupt operation of the machine upon actual contact with the hand or limb of a user. These existing systems, however, may interfere with smooth operation of the machine, such as by interrupting operation where a blade-contact event is unlikely. In systems based on actual blade contact, such systems may not interrupt machine operation in quickly enough to prevent serious injury. Moreover, many existing systems use destructive blade contact to stop rotation of the saw blade, which can damage the blade or machine.

One such system that uses destructive blade contact to stop rotation of the saw blade applies a pulsed electrical signal to one side of the blade through a capacitive coupling. The signal is picked up by a plate on another side of the blade, which sends it to a threshold detector. If a human contacts the blade, the signal will fall below a threshold, and after a predetermined time, destructive blade contact will be deployed to stop the blade. This method of detecting human body contact, however, is complex and adds additional cost to the machine, and uses a fusible link and aluminum blade grabber that are sacrificed when stopping rotation of the blade.

In view of the above, there is a need for a safety system and method for power tools, such as saws, that can reliably detect contact of a blade with an extremity of a user, and can stop rotation of the blade to prevent significant injury to the user and without sacrificing machine or system components.

SUMMARY OF THE INVENTION

It is an object of the present invention to provide a safety system and method for power tools.

It is another object of the present invention to provide a safety system and method for power tools such as circular saws, radial arm saws, table saws and miter saws.

It is another object of the present invention to provide a safety system and method for power tools that stops the blade of a power tool upon skin contact without damaging or destroying the blade.

It is another object of the present invention to provide a safety system and method for power tools that is inexpensive to implement.

It is another object of the present invention to provide a safety system and method for power tools that can be easily tested to ensure proper working order prior to operation of the power tool.

It is another object of the present invention to provide a safety system and method for power tools that can be retrofit onto existing power tools.

These and other objects are achieved by the present invention.

In an embodiment, a safety system for a power tool having a motor and a cutting tool driven by the motor includes a control device configured to detect a direct contact of a conductive material with the cutting tool, the direct contact of the conductive material with the cutting tool defining a contact event, and a braking device movable between a retracted position and an engaged position. The control device is configured to interrupt electrical power to the motor and control the braking device to the engaged position when the contact event is detected.

In another embodiment, a power tool includes a motor, a cutting tool driven by the motor, and a safety system configured to interrupt electrical power to the motor and to stop rotation of the cutting tool upon detection of a contact event with the cutting tool, the safety system including a control device configured to detect the presence of the contact event and a braking device configured to stop rotation of the cutting tool subsequent to the contact event. The control device is configured to interrupt electrical power to the motor and to actuate the braking device when the contact event is detected.

In yet another embodiment, a method for operating a power tool includes the steps of activating a safety system for the power tool, wherein in an activated state a braking device is held in touching contact with a cutting tool or rotating hub of the power tool and power is not supplied to a motor of the power tool, resetting the safety system to disengage the braking device from the cutting tool or the rotating hub and to allow power to flow to the motor to rotate the cutting tool, detecting a contact event of a conductive material with the cutting tool, and upon detection of the contact event, interrupting a flow of power to the motor and engaging the braking device with the cutting tool or rotating hub to non-destructively stop rotation of the cutting tool.

DETAILED DESCRIPTION OF THE INVENTION

Figure 1:
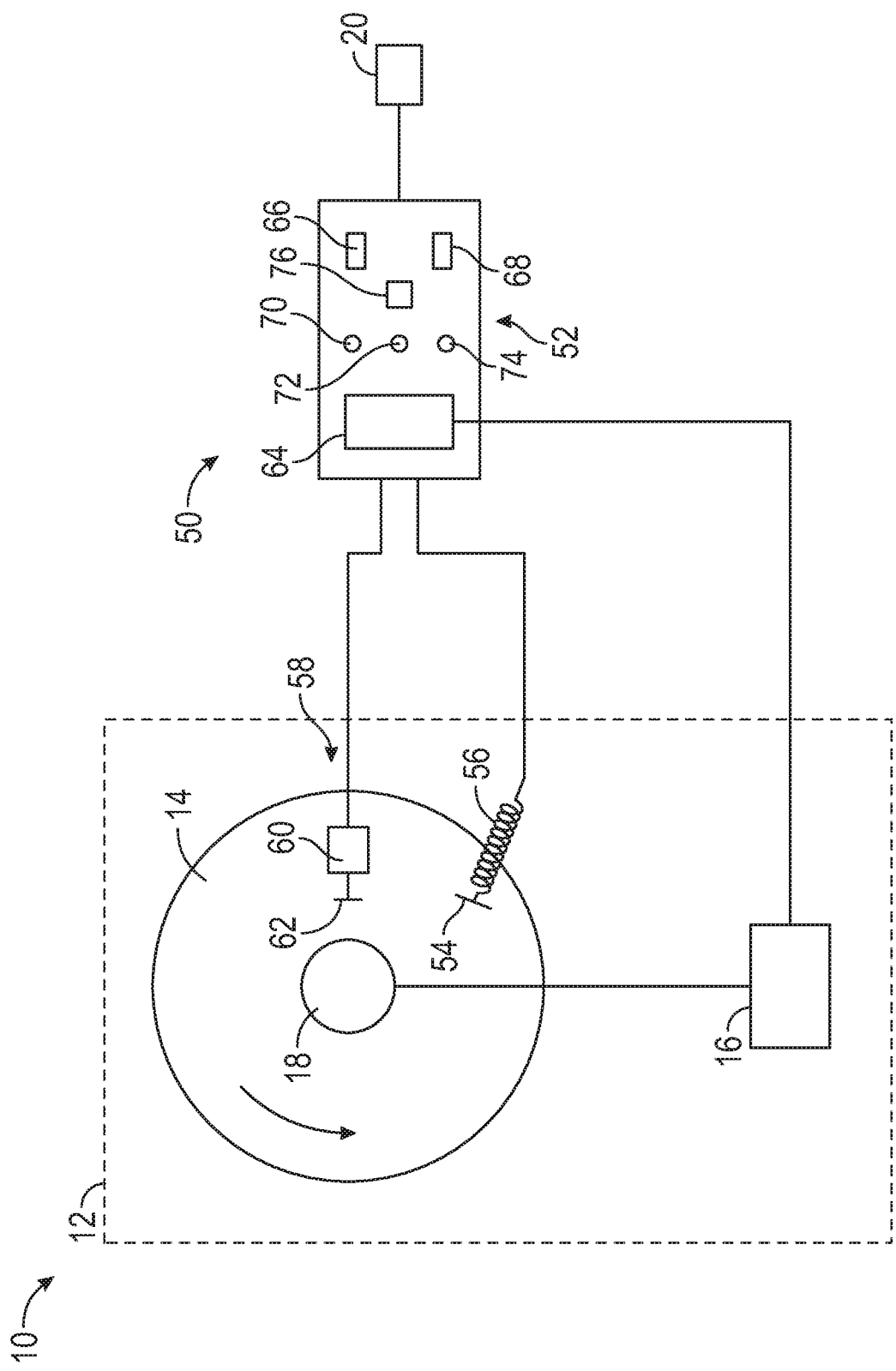
FIG. 1 is a schematic illustration of a safety system of the present invention, shown in the context of a power tool having a rotating saw blade.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled", "electrically connected" and "electrical communication" means that the referenced elements are directly or indirectly connected such that an electrical current may flow from one to the other. Such connections may include a direct conductive connection (i.e., without an intervening capacitive, inductive or active element), an inductive connection, a capacitive connection, and/or any other suitable electrical connection. Intervening components may be present. As will be appreciated, the terms "electrical current", "electrical power", "electrical flow", "power" and/or other similar terms are used herein to refer to the flow of electrons through one or more conducting wires, sensors, lights, motors, power transformers and/or other similar electrical devices. The term "electrical load" means a device or apparatus that consumes electrical power. Additionally, the abbreviations "VAC" and "VDC" refers to "volts alternating current" and "volts direct current", respectively. As used herein, "conductive material" means a material that easily allows the flow of electrical current and includes the skin of a user or a conductive material in direct contact with the skin of a user (i.e., with no intervening material such as a glove).

Referring to FIG. 1, a machine that may incorporate a safety system according to an embodiment of the invention is schematically shown and indicated generally at 10. The machine 10 may be any type of power tool used in the art for cutting, drilling, sawing, etc. workpieces such as wood, MDF, plastic, metal, etc., including, but not limited to, a circular saw, miter saw, radial arm saw, table saw, band saw, planer, drill press, lathe, router, etc. The machine/power tool 10 includes a frame or chassis 12 within which is mounted a cutting tool 14, and a motor 16 configured to drive the cutting tool 14. As shown in FIG. 1, in an embodiment, the cutting tool 14 may be a saw blade having plurality of teeth (not shown) mounted on rotating shaft or hub 18, and the motor 16 is configured to rotatably drive the hub 18 and saw blade 14. In other embodiments, the particular form of the cutting tool 14 may vary depending on the particular type/form of the machine 10. The machine 10 is configured for connection to a power source 20 for powering the motor 16. In an embodiment, the power source 20 may be an external power source such as AC mains power, although it is contemplated that the power source may alternatively be an internal/integrated battery.

Referring still further to FIG. 1, in an embodiment, the machine 10 may further include a safety system 50. The safety system 50 may be integrated with the machine 10, or may be sold as an aftermarket system that may be retrofit onto machine 10. As shown in FIG. 1, the safety system 50 includes a control device 52 connected to a power source, such as power source 20. In an embodiment, the control device may be interposed between the power source 20 and the motor 16 or selectively controlling the flow of electrical power to the motor 16. The system 50 further includes a contact wiper 54 electrically connected to the control device 52. The contact wiper 54 may be, for example, a carbon motor brush that is held against the cutting tool 14 (i.e., the saw blade) by a spring 56. In an embodiment, 12 vDC is applied to the cutting tool 14 through this pathway. Importantly, the cutting tool 14 which the wiper 54 contacts is electrically isolated or insulated from the machine 10.

As also shown in FIG. 1, the safety system further includes a braking device 58 electrically connected to, and controllable by, the control device 52. In an embodiment, the braking device 58 is a frictional braking device. The braking device 58 is controllable between a first position, where the braking device 58 allows for free rotation or movement of the cutting tool 14, and a second position, where the braking device 58 inhibits or substantially prevents rotation or movement of the cutting tool 14.

For example, in an embodiment, the frictional braking device 58 may include a solenoid 60 and friction pad 62. The braking device 58 is arranged in close association with the cutting tool 14 or hub 18, and the solenoid 60 is actuatable under control of the control device 52 to extend the friction pad 62 to contact the blade 14 or hub 18 to stop rotation of the blade 14 and hub 18, as described hereinafter. It is contemplated, however, that the braking device 58 can take any form so long as it is capable of quickly stopping operation and rotation of the cutting tool 14. For example, the braking device 58 may be a caliper, drum or band (like in a chainsaw), without departing from the broader aspects of the invention.

In operation, the control device 52 selectively provides power to the motor 16 (from power source 20) to power the machine 10, and provides 12 vDC to the blade 14 through contact wiper 54. In a no skin contact situation, the control device 52 allows free rotation of the cutting tool 14. The control device 52 is configured, however, to detect skin contact (such as an extremity of a user) with the cutting tool 14 and to deploy the braking device 58 to stop operation (e.g., rotation) of the cutting tool 14. In an embodiment, the control device 52 is configured to simultaneously or near-simultaneously interrupt electrical power to the motor 16 to stop the motor 16. In particular, when a skin-contact event is detected, the control device 52 is configured to actuate the solenoid 60 to extend the friction pad 62 into contact with the cutting tool 14 or hub 18 to stop rotation of the cutting tool 14. At the same time (or nearly the same time), the control device 52 cuts power to the motor 16.

In an embodiment, the control device 52 may include an on-board operational amplifier 64 running as a comparator, the operation of which will be hereinafter described. As shown in FIG. 1, the control device 52 may include a first switch 66, a second switch 68, and a plurality of indicator lights such as, for example, a first indicator light 70 (e.g., a green LED), a second indicator light 72 (e.g., a red LED) and a third indicator light 74 (e.g., an orange LED). It is contemplated that the switches 66, 68 may be any type of actuator device such as a button, toggle switch or the like. While FIG. 1 illustrates all of the indicator lights and switches/buttons being integrated into a single device housing, the present invention is not so limited in this regard. In particular, it is contemplated that the indicator lights and switches/buttons may be separate from one another (i.e., not integrated into a single housing).

In operation, the first switch 66 is actuated to power on the machine. In this state, the motor 16 is off and the braking device 58 is active (i.e., it is in a position that inhibits or prevents rotation of the cutting tool 14). Actuation of the first switch 66 also turns on/energizes the red indicator light 72, indicating to a user that the system has been initiated, but the motor is not operating. Actuation of the second switch 68 (also referred to as reset switch or button) retracts the braking device 58 (e.g., by de-energizing the solenoid 60)

and provides electrical power to the motor 16, allowing for the motor to rotate the cutting tool 14. Actuating the second switch 68 also turns on/energizes the green indicator light 70, indicating to a user that the brake is off and the cutting tool 14 is rotating. As discussed above, upon detecting skin contact, the control device 52 cuts power to the motor 52 and activates the braking device 58 to stop rotation of the cutting tool 14. The machine 10 and safety device 50 remain in this state until the reset switch 68 is again actuated (which powers the motor and retracts the braking device).

In an embodiment, the safety system 50 also includes a third switch or button 76 that, when actuated, disables the safety system 50. Actuating the disable switch 76 also turns on/energizes the orange indicator light 74, indicating to a user that the safety system 50 has been disabled. Importantly, the ability of a user to easily disable the safety system 50 allows a user to use the machine 10 to cut conductive materials such as metal. In particular, disabling the safety system 50 ensures that the machine 10 will not cut out when the conductive workpiece contacts the blade.

Figure 2:
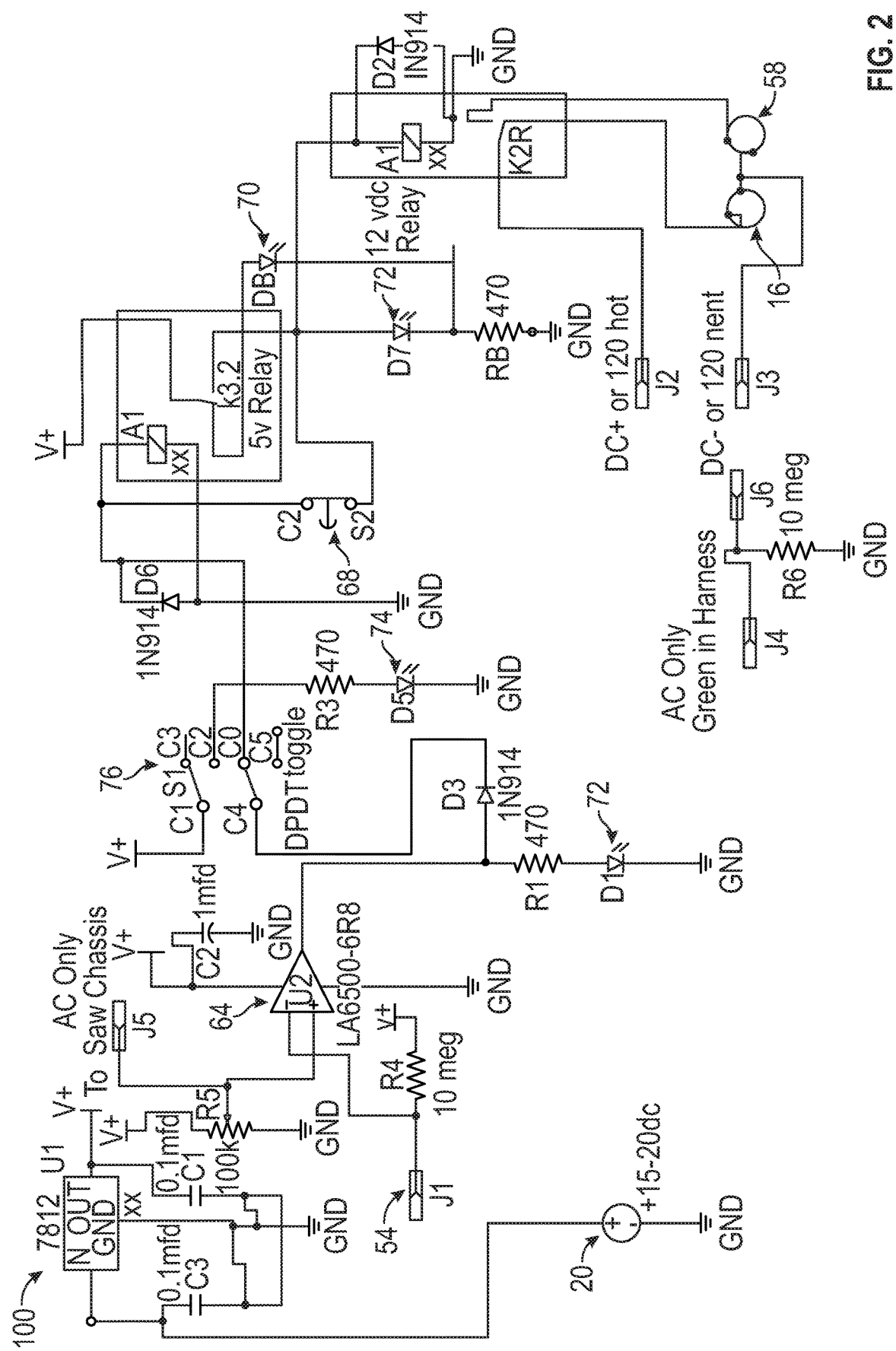
FIG. 2 is a circuit diagram illustrating of the safety system of FIG. 1, according to one embodiment of the invention.

Turning now to FIG. 2, a circuit diagram 100 illustrating one possible configuration of the safety system 50 for machine 10, is shown. All points denoted V+ may be fixed 12 vDC, and all points marked GND are circuit board ground. In an embodiment, all resistors are ¼ watt, 5%. Power source 20, as discussed above, may be a wall transformer or onboard battery configured to provide 12 vDC under load. U1 is a three terminal regulator to supply fixed 12 vDC to the electronics. C3 and C1 are bypass capacitors for a 7812 U1 regulator. In an embodiment, depending on whether AC or DC power is employed, U1 and C3 and C1 may be omitted. R5 is trimmer potentiometer set to keep pin 1 of the power operational amplifier 64 at 6 vDC, which can be trimmed to allow for tolerance of the resistors and other components. J5 is a connection to the machine chassis 12, which is only needed or not depending on the characteristics of an AC motor and the brake system 58.

With further reference to FIGS. 2, J1 and R4 connect 12 vDC to the cutting tool 14 through the contact wiper 54. As indicated above, the contact wiper 54 may be a carbon motor brush held against the cutting tool 14 by spring 56. In an embodiment, the operational amplifier 64 may be a LA6500-6R8 operational amplifier running as a comparator. As described above, in a "no skin contact" (i.e., no skin contact with the cutting tool 14) situation, the pin 2 voltage of the opamp 64 is higher than the pin 1 voltage, so the opamp 64 does not put out a signal. On skin contact, however, the pin 2 voltage is brought below pin 1, and the opamp puts out a signal to shut down the machine 10 (i.e., cut power to the motor 14).

Referring still further to FIG. 2, R1,D1 network illuminates indicator light 70, powered thru R1 to indicate a contact incident. D3 isolates the opamp signal from back voltages that might be present. In an embodiment, the third switch 76 may be a DPDT toggle switch. In one position it passes a detect signal to the following relays. In the other position it cuts off the detect signal and lights the orange indicator light 74 powered thru R3 to show that the safety system 50 is not active. Shutting off the safety system 50 may be required when cutting conductive material or the environmental conditions of the work site will not let the safety system function as intended, as described above.

D6 is catch diode for the inductive kick from the 5 v relay. As shown in FIG. 2, the reset switch 68 may be a momentary NC switch to release the magnetic hold-off of the 5 v relay. On a contact signal, the 5 v relay operates to light indicator light 72, which is powered thru R8, and powers the coil of the 12 v relay to cause shut-down. When the 5 v relay is energized it becomes a magnetically held relay that will not release until switch 68 is operated (reset). In an embodiment, the 5 v relay may be used because the detect signal from the opamp 64 does not put out enough power to operate the motor and brake 12 v relay.

With continued reference to FIG. 2, indicator light 72, powered thru R8 indicates a lock-out condition. Indicator light 70, likewise powered thru R8, indicates "ready to run", as discussed above. J4,R6 and J6 network is only for AC applications to bring the circuit board ground potential to the power line ground potential. The 12 v relay provides operating power to the motor 14 or brake 58. D2 is a catch diode for the inductive kick of the 12 v relay coil. As indicated above, the cutting tool 14 is electrically insulated from the machine chassis 12.

Importantly, and in stark contrast to existing systems and devices, the safety system 50 of the present invention utilizes natural body capacitance as the source of the signal to the control device 52 to disable the machine 10 and apply the braking device 58. Moreover, and in stark contrast to existing devices which use capacitive couplings, the present invention uses direct contact with the blade (via the contact wiper) as a means of signal detection. In addition, the use of an opamp 64 running as a simple comparator to determine whether a contact event has occurred, and to cut the motor 14 and apply the braking device 58, provides for a simple and low cost means of ensuring operator safety. The present invention is capable of cutting power to the motor 14 within 3/240 second of a skin contact event, and the braking device 58 can stop rotation of the cutting tool 58 in close proximity thereto, depending on the particular configuration of the braking device 58. In an embodiment, the motor 14 may be utilized to help stop rotation of the cutting tool 14 (e.g., if the motor has dynamic braking or is a permanent magnet).

By utilizing a frictional brake (in conjunction with cutting of power to the motor 14), the integrity of the safety system 50, machine 10 and cutting tool 14 is maintained even after a contact even. This is in contrast to existing systems which employ destructive blade grabbers and/or blade retraction. In particular, after detecting a blade contact event and cutting power to the motor and stopping rotation of the blade, the machine 10 can be ready for reuse simply by activating the reset switch 68. With existing devices that use destructive blade grabbing, the blade grabber, blade and other components of the machine may be destroyed, requiring new parts to be installed, which can be quite tedious and costly.

Moreover, by stopping the blade via non-destructive means, the safety system 50 of the present invention can be easily tested prior to each use to ensure proper and effective operation. For example, prior to using the machine 50, a user can activate the safety system 50 and machine 10 and bring a conductive test device (e.g., a strip or piece of aluminum foil in contact with the skin of a user) into contact with the cutting tool 14 to ensure that the motor 14 is disabled and the braking device 58 is actuated. The system 50 can then simply be reset and the machine 10 used as desired. This testing process is simply not possible or practical with existing 'destructive' systems, as the testing process would destroy the blade and other components of the machine prior to use.

While the embodiments described herein disclose the use of an electromechanical relay as a control element, other devices such as a solid state transistor, SCR, TRIAC or solid state relay may be utilized without departing from the broader aspects of the invention.

As described above, the safety system 50 of the present invention may be integrated with the machine 10 upon manufacture to provide a level of user safety heretofore not seen in the art. It is further contemplated that the safety system 50 can retrofit onto almost any existing power tool device very easily to provide an additional level of safety to conventional power tools.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A safety system for a power tool having a motor and a cutting tool driven by the motor, the safety system comprising:
   a control device configured to detect a direct contact of a conductive material with the cutting tool, the direct contact of the conductive material with the cutting tool defining a contact event;
   a contact wiper electrically coupled to the control device, the contact wiper contacting the cutting tool and transmitting a voltage to the cutting tool; and
   a braking device movable between a retracted position and an engaged position;
   wherein the control device is configured to interrupt electrical power to the motor and control the braking device to the engaged position when the contact event is detected.

2. The safety system of claim 1, wherein:
   the braking device is a frictional braking device; and
   wherein in the engaged position, a friction pad of the braking device contacts the cutting tool or a rotating hub of the power tool to stop rotation of the cutting tool.

3. The safety system of claim 1, wherein:
   the braking device includes the friction pad and a solenoid;
   wherein the solenoid is configured to retract and extend the friction pad.

4. The safety system of claim 1, wherein:
   the contact wiper is spring-biased into contact with the cutting tool.

5. The safety system of claim 1, wherein:
   the control device is an operational amplifier.

6. The safety system of claim 1, wherein:
   upon powering on the safety system, the control device is configured to prevent a flow of power to the motor and to maintain the braking device in the engaged position.

7. The safety system of claim 1, further comprising:
   a reset switch electrically coupled to the control device, the reset switch being actuatable to allow a flow of electrical power to the motor to rotate the cutting tool and to move the braking device to the retracted position.

8. The safety system of claim 7, further comprising:
   a bypass switch electrically coupled to the control device, the bypass switch being actuatable to disable the safety system so that electrical power is permitted to flow to the motor and the braking device is maintained in the retracted position upon a contact event.

9. The safety system of claim 1, wherein:
   the power tool is one of a circular saw, miter saw, radial arm saw, table saw, band saw, planer, drill press, lathe, or router.

10. The safety system of claim 1, wherein:
    the control device is configured to output a signal to interrupt electrical power to the motor and control the braking device to the engaged position when a detected voltage is below a second detected voltage.

11. A power tool, comprising:
    a motor;
    a cutting tool driven by the motor; and
    a safety system configured to interrupt electrical power to the motor and to stop rotation of the cutting tool upon detection of a contact event with the cutting tool, the safety system including a control device configured to detect the presence of the contact event and a braking device configured to stop rotation of the cutting tool subsequent to the contact event;
    wherein the control device is configured to interrupt electrical power to the motor and to actuate the braking device when the contact event is detected
    wherein the safety system includes a contact wiper electrically coupled to the control device, the contact wiper contacting the cutting tool and transmitting a voltage to the cutting tool.

12. The power tool of claim 11, wherein:
    the braking device is a frictional braking device having a frictional braking pad; and
    wherein the friction pad is configured to contact the cutting tool or a rotating hub of the power tool to stop rotation of the cutting tool.

13. The power tool of claim 12, wherein:
    the braking device includes the friction pad and a solenoid;
    wherein the solenoid is configured to retract and extend the friction pad.

14. The power tool of claim 11, wherein:
    the contact wiper is spring-biased into contact with the cutting tool.

15. The power tool of claim 11 wherein:
    the control device is an operational amplifier.

16. A power tool, comprising:
    a motor;
    a cutting tool driven by the motor; and
    a safety system configured to interrupt electrical power to the motor and to stop rotation of the cutting tool upon detection of a contact event with the cutting tool, the safety system including a control device configured to detect the presence of the contact event and a braking device configured to stop rotation of the cutting tool subsequent to the contact event;
    wherein the control device is configured to interrupt electrical power to the motor and to actuate the braking device when the contact event is detected
    wherein the control device is an operational amplifier; and
    wherein the operational amplifier is configured to output a signal to interrupt electrical power to the motor and control the braking device to stop rotation of the cutting tool when a second pin voltage of the operational amplifier is below a first pin voltage of the operational amplifier.

17. A method for operating a power tool, comprising the steps of:
    activating a safety system for the power tool, wherein in an activated state a braking device is held in touching contact with a cutting tool or rotating hub of the power tool and power is not supplied to a motor of the power tool;

resetting the safety system to disengage the braking device from the cutting tool or the rotating hub and to allow power to flow to the motor to rotate the cutting tool; and detecting a contact event of a conductive material with the cutting tool;

upon detection of the contact event, interrupting a flow of power to the motor and engaging the braking device with the cutting tool or rotating hub to non-destructively stop rotation of the cutting tool; and touching a conductive material to the cutting tool during rotation of the cutting tool to non-destructively test operation of a safety system of the power tool.

\* \* \* \* \*